(12) United States Patent
Takanashi

(10) Patent No.: US 6,243,096 B1
(45) Date of Patent: Jun. 5, 2001

(54) INSTRUCTION INPUT SYSTEM WITH CHANGEABLE CURSOR

(75) Inventor: Nobuaki Takanashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/174,226

(22) Filed: Oct. 16, 1998

(30) Foreign Application Priority Data

Oct. 17, 1997 (JP) .................................................. 9-285028

(51) Int. Cl.$^7$ .................................................. G06T 17/00
(52) U.S. Cl. ........................ 345/419; 345/145; 345/157
(58) Field of Search ................................... 345/418, 419, 345/425, 427, 145, 157, 158, 159, 162, 163

(56) References Cited

U.S. PATENT DOCUMENTS

| | | | |
|---|---|---|---|
| 5,321,766 | * | 6/1994 | Frass et al. ........................... 345/419 |
| 5,414,801 | * | 5/1995 | Smith et al. .......................... 345/419 |
| 6,052,115 | * | 4/2000 | Gregg et al. .......................... 345/157 |
| 6,057,826 | * | 5/2000 | Gaultier et al. ....................... 345/157 |
| 6,094,189 | * | 7/2000 | Quillen et al. ........................ 345/157 |
| 6,094,190 | * | 7/2000 | Kodim .................................. 345/157 |
| 6,118,449 | * | 9/2000 | Rosen et al. .......................... 345/145 |
| 6,137,472 | * | 10/2000 | Pekelney et al. ...................... 345/145 |

FOREIGN PATENT DOCUMENTS

| | | |
|---|---|---|
| 63-140603 | 9/1988 | (JP) . |
| 1-138137 | 9/1989 | (JP) . |
| 5-80932 | 4/1993 | (JP) . |
| 5-143694 | 6/1993 | (JP) . |
| 6309139 | 11/1994 | (JP) . |
| 7-134730 | 5/1995 | (JP) . |
| 8-123841 | 5/1996 | (JP) . |

* cited by examiner

Primary Examiner—Cliff N. Vo
(74) Attorney, Agent, or Firm—Ostrolenk, Faber, Gerb & Soffen, LLP

(57) ABSTRACT

An instruction input that permits convenient input of instructions for moving an object in three-dimensional space. A desired instruction is entered by an input device and displayed on the screen of a display device. The instruction specifies at least one position change and one attitude change of the object. A cursor generator displays a cursor showing the position and the attitude of the object. A cursor controller specifies a post-motion position and a post-motion attitude of the main cursor according to the entered instruction. The cursor controller forms a mathematical projection of the main cursor onto a plane based on the specified post-motion position and the specified post-motion attitude of the main cursor which is displayed on the display device to show the post-motion position and post-motion attitude of the object after the desired motion specified by the instruction.

12 Claims, 16 Drawing Sheets

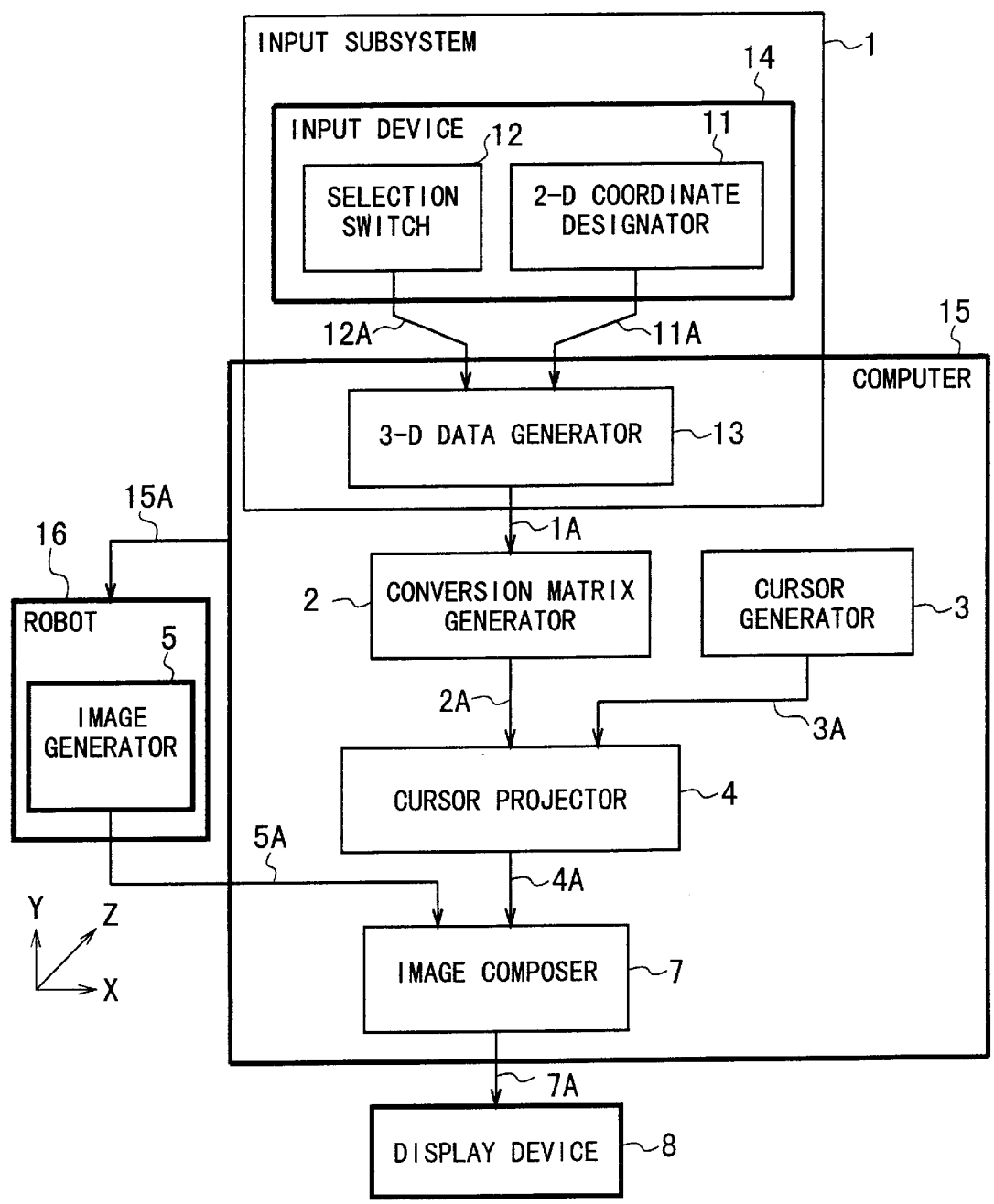

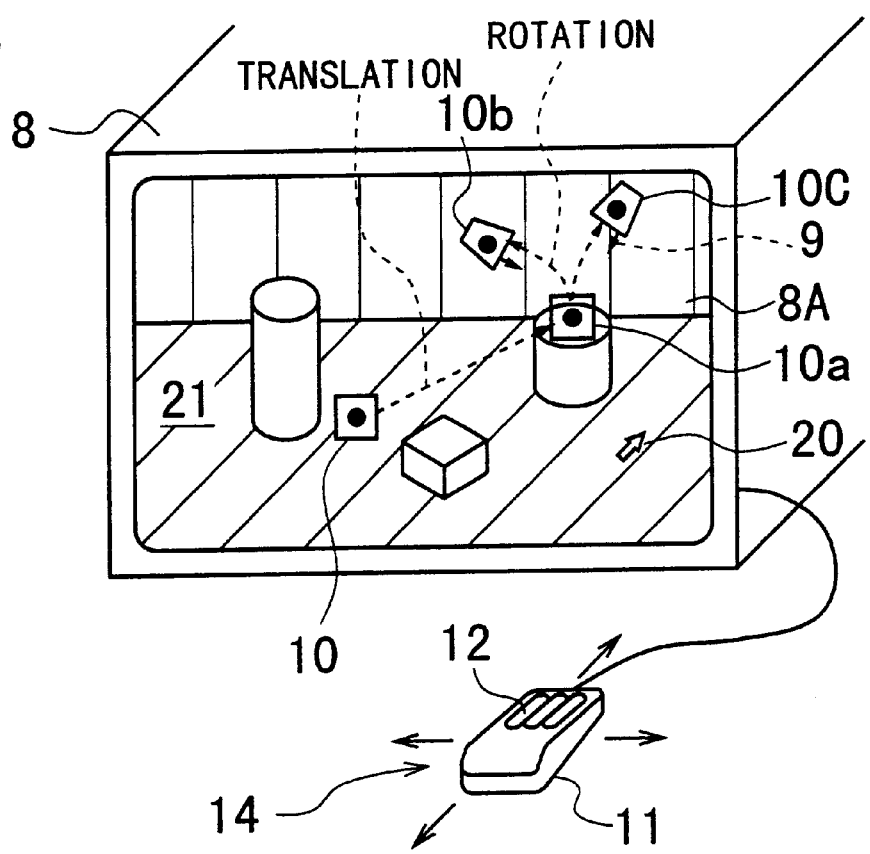

INSTRUCTION INPUT SYSTEM WITH CHANGEABLE CURSOR

BACKGROUND OF THE INVENTION

1. Field of the Invention

The present invention relates to an instruction input system and more particularly, to an instruction input system for inputting instructions to move an object existing in a three-dimensional space, which includes a changeable cursor displayed on a screen and an input device such as a mouse or joystick.

2. Description of the Prior Art

Conventionally, robots are typically designed to be moved in a three-dimensional space and therefore, they are capable of various motions such as translations along three orthogonal coordinate axes X, Y, and Z and rotations around the same coordinate axes. Any one of the possible motions is given by a combination of the six elementary motions, i.e., three translational motions along the coordinate axes X, Y, and Z and three rotational motions around the same coordinate axes. In this case, it is said that the motions of the robots have six degrees of freedom.

To apply or input a desired moving instruction to the robot, a proper specification or designation is necessary for each degree of freedom, i.e., each of the six elementary motions.

The same requirement as that in the robots is applied to three-dimensional (3-D) Computer-Aided Design (CAD) systems, which are capable of designing an object while displaying three-dimensionally the object on a screen of a display device.

When an operator or designer gives his desired instructions to move the object in the 3-D CAD system through the screen of the display device, conventionally, various instruction input subsystems have been developed and practically used.

In a first example of the conventional instruction input subsystems of this sort, six rotatable knobs are provided on a screen of a display device. These knobs are rotated with the use of an input device such as a mouse. A desired motion of an object existing in the three-dimensional space is inputted into a 3-D CAD system by rotating at least one of the six knobs by a necessary angle or angles. The motion of the object is designated by the combination of the applied rotation angles of the knobs and the rotation orientations thereof.

However, the first example of the conventional instruction input subsystems has the following problem.

Specifically, when an instruction causing a complicated motion of the object is inputted, two more of the six knobs need to be suitably rotated at a time. However, such the complicated rotational operations are difficult to be realized by the operator or designer. This is because the designer usually operates the input device (typically, a mouse) by one hand and accordingly, the desired complicated motion of the object needs to combine the necessary rotational operations of the individual knobs.

In a second example of the conventional input subsystems of this sort, which is disclosed in the Japanese Non-Examined Patent Publication No. 8-123841 published in May 1996, an input device such as a mouse or tablet, which is used to move a mouse cursor displayed on a screen of a display device, is equipped with a mode-selection button in addition to the normal operation buttons. The mode-selection button is used to select one of the normal operation mode and the moving-direction designation mode of the 3-D CAD system.

In the normal operation mode, the motion of the input device on a plane corresponds to the motion of the mouse cursor displayed on the screen. On the other hand, in the moving-direction designation mode, each of the operation buttons is used to select two of the orthogonal coordinate axes X, Y, and Z in the three-dimensional space where an object exists.

For example, when one of the operation buttons is clicked to select the X and Y axes, the motion of the input device (i.e., the mouse) on the plane corresponds to the actual motion of the mouse cursor along the selected axes X and Y (i.e., on the X-Y plane) in the three-dimensional space. Similarly, when the button designed for selecting the axes Y and Z or the axes Z and X is clicked, the motion of the input device on the plane corresponds to the actual motion of the mouse cursor along the selected axes Y and Z (i.e., on the Y-Z plane) or the selected axes Z and X (i.e., on the Z-X plane) in the three-dimensional space.

Alternately, in the moving-direction designation mode, each of the operation buttons is be used to select each of the three coordinate axes X, Y, and Z of the three-dimensional space and a XYZ direction thereof. In this case, when one of the buttons is clicked to select the X, Y, or Z axis, the motion of the input device on the plane corresponds to the actual motion of the mouse cursor along the axis X, Y, or Z in the three-dimensional space. When the button designed for selecting the XYZ direction is clicked, the motion of the input device on the plane corresponds to the actual motion of the mouse cursor along the XYZ direction (i.e., a direction not on the X-Y, Y-Z, and Z-X planes).

Since the motion along the XYZ direction is three-dimensional, this motion is unable to be determined by only the two-dimensional motions of the input device. Therefore, the motion of the input device along the XYZ direction needs to be designed so that the actual motion of the mouse cursor along the XYZ direction in the three-dimensional space is determined under a proper restriction defining the ratio between the axial motions x, y, and z along the axes X, Y, and Z, e.g., x:y:z=2:3:5.

Thus, in the second example of the conventional input subsystems disclosed in the Japanese Non-Examined Patent Publication No. 8-123841, the mouse cursor displayed on the screen of the display device has the positional data in a three-dimensional coordinate system of the three-dimensional space. Therefore, the actual position of the mouse cursor in the three-dimensional space is optionally determined by two-dimensionally moving the mouse cursor on the screen.

However, the second example of the conventional input subsystems has a problem that the operator or designer is unable to recognize directly the relationship or correspondence between the two selected motions in the three-dimensional space and the two-dimensional motions of the input device (or, of the mouse cursor displayed on the screen) movable on the plane.

Further, there have been known remote-controllable robots designed to be controlled through communication networks, an example of which is shown in FIG. 1.

This example of the conventional remote-controllable robots has a video camera (not shown) and an input subsystem. The input subsystem includes two buttons 151a and 151b displayed on a screen 152 of a display device 150 in addition to a cursor (not shown) of an input device (not shown) such as a mouse. These two buttons 151a and 151b are dedicated to translational and rotational motions of the video camera, respectively. A rectangular window 152a for displaying an image 152b picked up by the camera is formed on the screen 152.

A user or operator moves the cursor on the screen 152 using the input device until the cursor is overlapped with a desired one of the buttons 151a and 151b and then, he clicks the button 151a or 151b thus selected, thereby selecting the desired sort of motion, i.e., a translational or rotational motion of the camera. Subsequently, he moves the cursor on the screen 152 by moving the input device on a plane, thereby giving an instruction to the robot to perform a desired motion (i.e., translational or rotational motion). The instruction is transmitted through the communication network to the robot. According to the instruction thus given, the robot moves the camera and consequently, a new image is transmitted through the network and is displayed in the window 152a of the screen 152.

In the third example of the conventional input subsystems, although the configuration is simple, there is a problem that the desired motion of the video camera is indirectly designated.

Additionally, there is another problem as follows.

If the new image that has been picked up by the video camera is transmitted to the display device 150 with a comparatively long time lag due to some restriction in the communication performance, an actually-inputted value for a desired motion of the camera tends to be excessive with respect to the value necessary for the desired motion. This necessitates an extra operation for the user to correct the prior operation, thereby degrading the operation efficiency.

SUMMARY OF THE INVENTION

Accordingly, an object of the present invention is to provide an instruction input system that makes it possible to readily and efficiently input instructions to move an object existing in a three-dimensional space using an input device and a cursor displayed on a screen.

Another object of the present invention is to provide an instruction input system that makes it possible for a user or operator to recognize directly a motion of the object that will occur in the three-dimensional space according to a desired instruction.

The above objects together with others not specifically mentioned will become clear to those skilled in the art from the following description.

An instruction input system according to the present invention is comprised of (a) an input subsystem for inputting a desired instruction by an input device through a screen of a display device, the instruction including a desired motion of changing at least one of a position and an attitude of an object existing in a three-dimensional space;

(b) a cursor generator for generating a main cursor designating the position and the attitude of the object, the main cursor is displayed on the screen of the display device;

(c) a cursor controller for specifying a post-motion position and a post-motion attitude of the main cursor by applying the desired motion included in the inputted instruction to the main cursor, and for forming a mathematical projection of the main cursor onto a plane based on the specified post-motion position and the specified post-motion attitude of the main cursor, the mathematical projection of the main cursor being displayed on the screen of the display device.

The mathematical projection of the main cursor on the screen designates a post-motion position and a post-motion attitude of the object after the object is moved according to the desired motion in the three-dimensional space.

With the instruction input system according to the present invention, when a desired instruction is inputted by the input subsystem through the screen of the display device to give a desired motion of changing at least one of the position and the attitude of the object existing in the three-dimensional space, the cursor controller specifies a post-motion position and a post-motion attitude of the main cursor by applying the desired motion included in the inputted instruction to the main cursor.

Further, the cursor controller forms a mathematical projection of the main cursor onto a plane based on the specified post-motion position and the specified post-motion attitude of the main cursor.

The mathematical projection of the main cursor thus formed, which is displayed on the screen of the display device, designates a post-motion position and a post-motion attitude of the object after the object is moved according to the desired motion in the three-dimensional space.

Accordingly, the desired instruction to move the object existing in the three-dimensional space is able to be readily and efficiently inputted using the input device and the main cursor displayed on the screen.

Besides, due to the mathematical projection of the main cursor displayed on the screen of the display device, a user or operator of the input system according to the present invention is able to recognize directly a motion of the object that will occur in the three-dimensional space according to the desired instruction.

In a preferred embodiment of the instruction input system according to the present invention, the cursor controller includes a conversion matrix generator for generating a conversion matrix according to the desired motion included in the inputted instruction. The conversion matrix is used to specify the post-motion position and the post-motion attitude of the main cursor. There is an additional advantage that the specifying operation for the post-motion position and the post-motion attitude of the main cursor and the formation operation for the mathematical projection of the main cursor are readily realized.

In another preferred embodiment of the instruction input system according to the present invention, the object is equipped with an image generator for generating an image of a specific target. The image of the target is displayed on the screen of the display device together with the main cursor. There is an additional advantage that the instruction input operation is carried out while viewing the image of the target displayed on the screen of the display device.

In this case, it is preferred that an image processor is additionally provided to cut a part of the image of the target, and to display the part of the image of the target in the main cursor as an internal image. There is an additional advantage that recognition of a motion of the object that will occur in the three-dimensional space according to the desired instruction is further facilitated because of the internal image.

In still another preferred embodiment of the instruction input system according to the present invention, the cursor generator generates an assistant cursor, and the assistant cursor is displayed on the screen of the display device. The assistant cursor designates an orientation of the main cursor. There is an additional advantage that the orientation of the main cursor is readily recognized.

In this case, it is preferred that the cursor controller specifies a post-motion position and a post-motion attitude of the assistant cursor by applying the desired motion included in the inputted instruction to the assistant cursor, and forms a mathematical projection of the assistant cursor onto the plane based on the specified post-motion position and the specified post-motion attitude of the assistant cursor. The mathematical projection of the assistant cursor is displayed on the screen of the display device. There is an additional advantage that the configuration of the input system is not complicated even if the assistant cursor is provided.

In a further preferred embodiment of the instruction input system according to the present invention, the input device in the input subsystem is capable of inputting six elementary motions of the desired instruction in the three-dimensional space. There is an additional advantage that no three-dimensional data generator is provided for generating a three-dimensional data from two-dimensional data inputted by the input device, which simplifies the configuration of the instruction input system.

In a still further preferred embodiment of the instruction input system according to the present invention, the input device in the input subsystem is capable of inputting two-dimensional data corresponding to the desired instruction in the three-dimensional space in each of input modes. The input device has a mode selection switch for selecting one of the input modes. The input subsystem has a three-dimensional data generator for generating a three-dimensional data from the two-dimensional data inputted in the respective input modes. There is an additional advantage that a popular input device such as a mouse or joystick with a simple configuration can be used as the input device in the input subsystem.

In this case, it is preferred that a first set of two-dimensional coordinate values are specified by a user at a timing when the mode selection button is operated and a second set of two-dimensional coordinate values are specified at a position determined by the user on the screen in each of the input modes. A set of two-dimensional difference values between the first and second sets of two-dimensional coordinate values are inputted from the input subsystem into the cursor controller as the desired motion of the object in the three-dimensional space.

For example, as the input modes of the input subsystem, first, second, and third input modes are provided for the input subsystem.

In the first input mode, two translational motions along two orthogonal coordinate axes defined on (i) the main cursor, (ii) the screen of the display device, or (iii) a plane parallel to the main cursor or the screen of the display device and apart from a specific distance from the main cursor or the screen of the display device are used as a first one of the set of two-dimensional difference values.

In the second input mode, a translational motion along a normal of the two orthogonal coordinate axes and a rotational motion around the normal are used as a second one of the set of two-dimensional difference values.

In the third input mode, two rotational motions around the two orthogonal coordinate axes are used as a third one of the set of two-dimensional difference values.

Also, in the third input mode, the two rotational motions around the two orthogonal coordinate axes may be defined while (i) a center of the main cursor or (ii) a point apart from the main cursor by a specific distance is used as a rotation center.

Moreover, in the third input mode, there is preferably provided with a virtual plane on the screen of the display device. The virtual plane is parallel to and apart from the screen of the display device and is intersected with the main cursor at an intersection point. An end point of the virtual plane is set at a position where the third input mode is selected on the screen of the display device. The end point of the virtual plane is rotatable around the intersection point toward a desired orientation by the input device while keeping a positional relationship between the virtual plane and the main cursor unchanged.

The object existing in the three-dimensional space may be a real body such as a robot and a video camera or a three-dimensional virtual image generated by an image generator device or system such as a 3-D CAD system.

BRIEF DESCRIPTION OF THE DRAWINGS

In order that the present invention may be readily carried into effect, it will now be described with reference to the accompanying drawings.

FIG. 2 is a block diagram showing the configuration of an instruction input system according to a first embodiment of the present invention, which is designed for a remote-controllable robot equipped with a video camera.

FIG. 3 is a schematic view of a screen and an image shown therein of a display device provided in the instruction input system according to the first embodiment of FIG. 2.

DETAILED DESCRIPTION OF THE PREFERRED EMBODIMENTS

Figure 1:
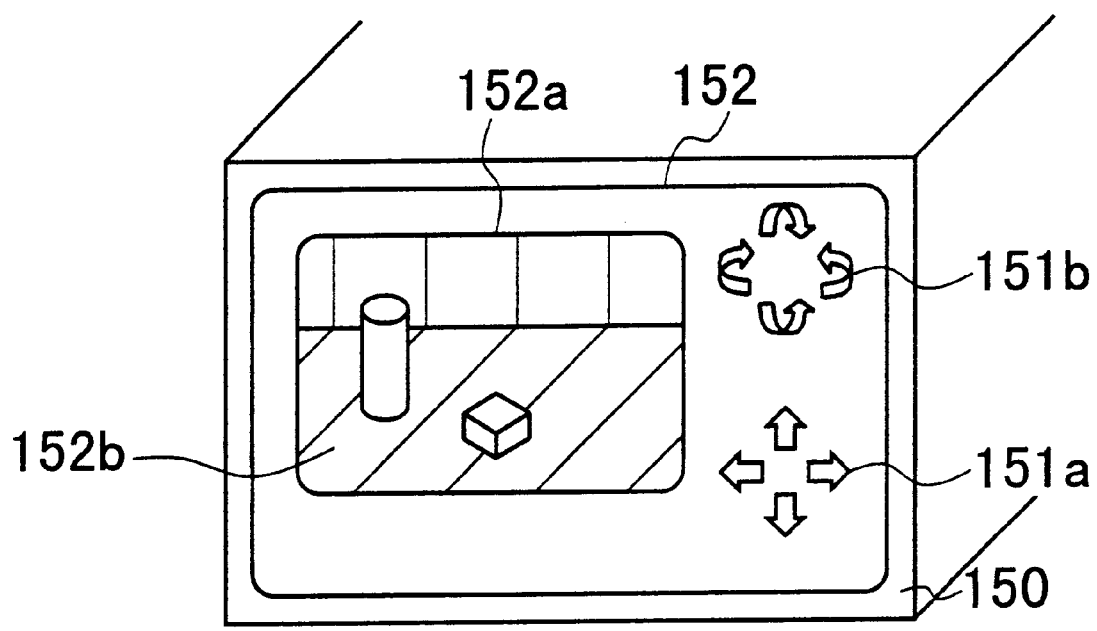
FIG. 1 is a schematic view of a screen and an image shown therein of a display device provided in a conventional instruction input system for a remote-controllable robot equipped with a video camera.

Preferred embodiments of the present invention will be described below referring to the drawings attached.

FIRST EMBODIMENT

FIGS. 2 and 3 show an instruction input system according to a first embodiment, which is comprised of an input subsystem 1, a conversion matrix generator 2, a cursor generator 3, a cursor projector 4, an image composer 7, and a display device 8.

The input subsystem 1 has an input device 14 and a three-dimensional data generator 13. The input device 14 has a two-dimensional coordinate designator 11 and a selection switch 12.

The three-dimensional data generator 13, the conversion matrix generator 2, the cursor generator 3, the cursor projector 4, and the image composer 7 are provided in a controller or computer 15.

As shown in FIGS. 2 and 3, this instruction input system is designed for inputting a moving instruction into the controller or computer 15 to move or control a robot 16 existing in a three-dimensional space. The robot 16 is equipped with a video camera as an image generator 5. The three-dimensional space is defined by three orthogonal coordinate axes, X, Y, and Z.

Since the robot 16 and the camera 5 are translational along each of the coordinate axes, X, Y, and Z and rotatable around the same, they have three possible translation motions along the coordinate axes, X, Y, and Z and three possible rotational motions around the same. This means that the motions of the robot 16 (and therefore, the camera 5) have six degrees of freedom.

A desired image 21 of the neighborhood of the robot 16 is picked up by the video camera 5 under the control of the controller 15 and then, the image 21 is displayed on a screen 8A of a display device 8. According to the instruction thus inputted, the robot 16 and therefore the position and/or attitude of the camera 5 are changed in the three-dimensional space, resulting in change of the image 21 on the screen 8A.

The cursor generator 3 generates a cursor data 3A of a main cursor 10 and outputs the cursor data 3A to the cursor projector 4. The main cursor 10 designates a post-motion position and a post-motion attitude of the robot 16 and the camera 5 from the present position and the present attitude of the camera 5. Here, as shown in FIG. 3, the main cursor 10 has a square shape when no rotational motion is applied to the cursor 10 on the screen 8A.

The desired translational and rotational motions and the post-motion position and the post-motion attitude of the robot 16 (and the camera 5) are indicated by the translational and rotational motions and the post-motion position and the post-motion attitude of the main cursor 10 on the screen 8A, respectively.

The input subsystem 1 outputs a three-dimensional motion data 1A to the conversion matrix generator 2. The motion data 1A specifies the desired three-dimensional motion of the robot 16 or camera 5 according to the inputted desired instruction.

The conversion matrix generator 2 generates a conversion matrix data 2A based on the three-dimensional motion data 1A supplied from the input subsystem 1. The conversion matrix data 2A is used to produce a three-dimensional data of the main cursor 10 according to the inputted desired instruction.

Using the cursor data 3A supplied by the cursor generator 3 and the conversion matrix data 2A produced by the conversion matrix generator 2, the cursor projector 4 produces a two-dimensional data 4A of the main cursor 10 that corresponds to a mathematical projection of the main cursor 10 to a plane parallel to the screen 8A. The two-dimensional data 4A thus produced is outputted to the image composer 7.

The image composer 7 receives the two-dimensional data 4A from the cursor projector 4 and the image data 5A from the video camera 5 of the robot 16 and composes them, thereby displaying the post-motion cursor 10 and the image 21 of the neighborhood of the camera 5 on the same screen 8A of the display device 8.

The main cursor 10 is treated as a square plane existing in the three-dimensional space where the robot 16 is provided. As shown in FIG. 3, the position and attitude of the main cursor 10 on the screen 8A are changed according to the applied motion, as indicated by reference symbols 10a, 10b, and 10c.

The post-motion position and the post-motion attitude of the main cursor 10 are given by the mathematical projection of the main cursor 10 moved in the three-dimensional space according to the inputted instruction. The symbol 10a indicates the post-motion position after a translational motion is applied to the cursor 10. The symbol 10a includes no change in shape. Each of the symbols 10b and 10c indicates the post-motion position and the post-motion attitude after a rotational motion is applied to the cursor 10. Each of the symbols 10b and 10c includes some geometric change in shape together with a positional change.

An arrow-shaped assistant cursor 9 is generated by the cursor generator 3 and is displayed on the screen 8A of the display device 8. This assistant cursor 9 indicates the orientation of the main cursor 10. In this case, there is an advantage that the recognition of the orientation of the main cursor 10 (i.e., the camera 5) is facilitated by the assistant cursor 9.

After the state of the screen 8A shown in FIG. 3, by operating a determination button (not shown) by the human operator, the inputted instruction is submitted to the robot 16 and then, the robot 16 is actually moved to the post-motion position in the three-dimensional space according to the inputted instruction.

When the desired motion of the robot 16 is completed, the main cursor 10 is returned to its initial position (e.g., a central position) on the screen 8A. At the same time, the geometric change of the cursor 10 disappears, resulting in a square shape. Thus, the cursor 10 is turned into a stand-by state for waiting for input of a next moving instruction.

As the input device 14 of the input subsystem 1, as shown in FIG. 3, a mouse capable of inputting a two-dimensional data for the desired moving instruction at a time, which means that this mouse has two degrees of freedom, is used. However, it is needless to say that any other input device such as a joystick with two degrees of freedom may be used for the input device 14 instead of the mouse 11. Also, any joystick with three or six degrees of freedom may be used as the input device 14. When any joystick with three-degrees of freedom or more is used, there is an additional advantage that the input efficiency is further raised.

When the input device 14 has two degrees of freedom, an input-mode selection switch is necessarily provided to select two ones of the six elementary motions in the three-dimensional space with the coordinate axes X, Y, and Z. The selected two motions need to correspond to two ones of the six elementary motions.

When the input device 14 has three degrees of freedom, an input-mode selection switch is necessarily provided to select one of the translational and rotational motions in the three-dimensional space.

When the input device 14 has six degrees of freedom, an input-mode selection switch is usually unnecessary. However, this selection switch may be necessarily provided to specify or select a rotation center of a desired rotational motion.

As shown in FIG. 3, an arrow-shaped mouse cursor 20 is displayed on the screen 8A of the display device 8 by the cursor generator 3. The mouse cursor 20 is movable on the screen 8A according to various applied motions to the mouse 14 independent of the main cursor 10.

The mouse 14 has three operation buttons 12 on its body 11 with a rotatable ball (not shown). One of the buttons 12 serves as an input-mode selection switch 12 for selecting one of the input modes.

Here, only when the mouse cursor 20 is overlapped with the main cursor 10 on the screen 8A and a specific one of the buttons 12 is operated, the main cursor 10 becomes able to be moved together with the mouse cursor 20. However, the main cursor 10 may be designed to be moved on the screen 8A only in a dedicated operation mode. In this case, the dedicated operation mode may be designed to be switched by operating a specific one of the buttons 12.

If a motion along a plane (e.g., on a flat surface of a desk or table) is applied to the mouse 14 by a human operator or user, the arrow-shaped mouse cursor 20 on the screen 8A is moved according to the applied motion of the mouse 14. If the mouse cursor 20 is located at a position on the screen 8A and then, a specific one of the buttons 12 of the mouse 14 is clicked by the operator, two-dimensional coordinates corresponding to the position where the cursor 20 is located are designated. The two-dimensional coordinates thus designated are inputted into the controller 15. Thus, the ball and one of the buttons 12 of the mouse 14 serve as a two-dimensional coordinate designator 11.

The two-dimensional coordinate designator 11 outputs a two-dimensional coordinate data 11A to the three-dimensional data generator 13. The selection switch 12 outputs a selection signal 12A to the three-dimensional data generator 13. The three-dimensional data generator 13 generates a three-dimensional data using the two-dimensional coordinate data 11A and the selection signal 12A, thereby outputting the three-dimensional data 1A according to the applied, desired instruction to the conversion matrix generator 2.

When the instruction input system according to the first embodiment is in the normal operation state, the arrow-shaped cursor 20 of the mouse 14 is displayed on the screen 8A at a present position. The position of the cursor 20 is successively renewed according to the applied motions to the mouse 14. In this case, the motion of the arrow-shaped cursor 20 is independent of that of the planar main cursor 10 and therefore, the main cursor 10 is not moved even if the mouse cursor 20 is moved. The mouse cursor 20 is used to perform usual operations such as an operation to point out a desired position on the screen 8A of the display device 8.

On the other hand, when the instruction input system according to the first embodiment is in the instruction input state, various desired instructions to move the robot 16 (and therefore, the camera 5) in the three-dimensional space are inputted.

To input a desired, three-dimensional motion of the camera 5, the desired motion is designated by translational motions along the coordinate axes X, Y, and Z and rotational motions around the same axes. Then, necessary translational motions along the coordinate axes X, Y, and Z and necessary rotational motions around the same axes are inputted into the controller 15 while changing the input modes by the use of the switch 12.

Specifically, when one of the buttons 12 of the mouse 14 is clicked by the human operator to select one of the three input modes, the main cursor 10 has an initial, two-dimensional coordinate values $(X_0, Y_0)$ on a two-dimensional plane (i.e., the flat surface of a table or desk) with two orthogonal coordinate axes $X_M$ and $Y_M$.

Then, the mouse 14 is moved to a position with two-dimensional coordinate values $(X_1, Y_1)$ along the two-dimensional plane to apply a desired motion of the camera 5. Thus, the necessary change of the two-dimensional coordinate values for the desired motion of the camera 5 is given as $(X_M=X_0-X_1, Y_M=Y_0-Y_1)$.

The correspondence of the necessary two-dimensional motion $(X_M, Y_M)$ to two of the six elementary motions in the three-dimensional space X, Y, and Z is carried out in the following way.

Figure 4A:
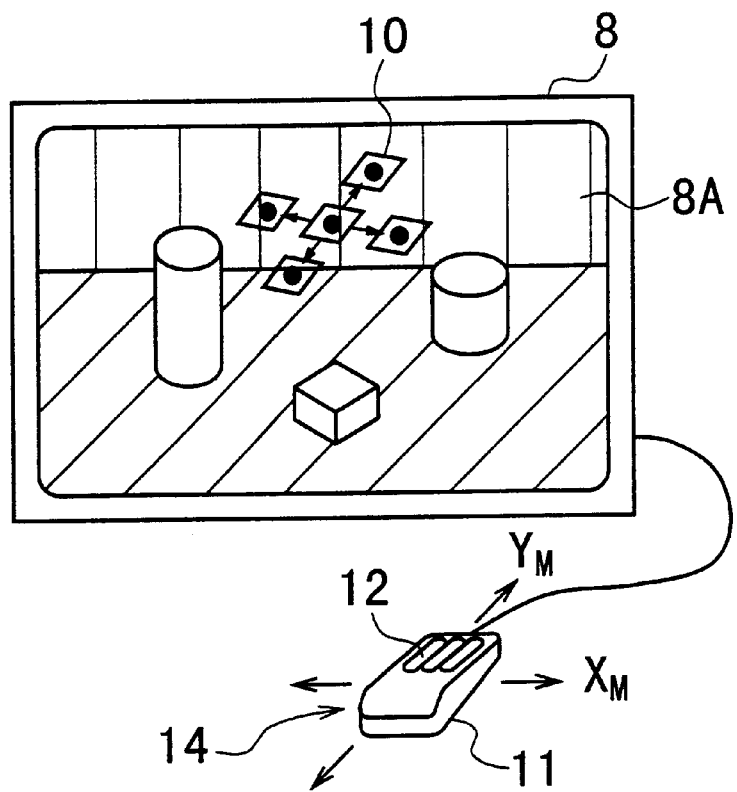
FIGS. 4A and 4B are schematic views showing the translational motions of the main cursor along the $X_C$ and $Y_C$ axes defined on the main cursor, which are caused by the translational motions of the mouse along the $X_M$ and $Y_M$ axes defined on a plane in the instruction input system according to the first embodiment of FIG. 2.
Figure 4B:
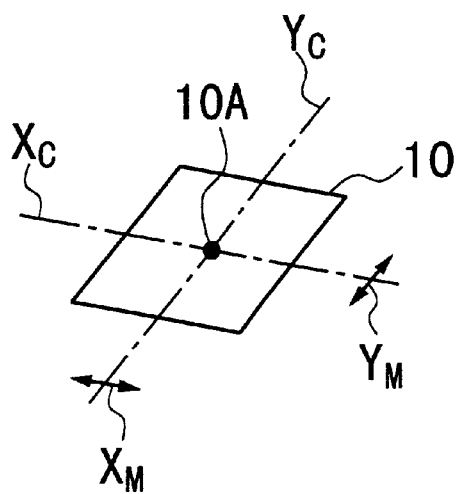

In the first input mode, as shown in FIGS. 4A and 4B, the translational motions $X_M$ and $Y_M$ of the mouse 14 correspond to the translational motions along the coordinate axes $X_C$ and $Y_C$ defined on the main cursor 10, respectively.

Figure 5A:
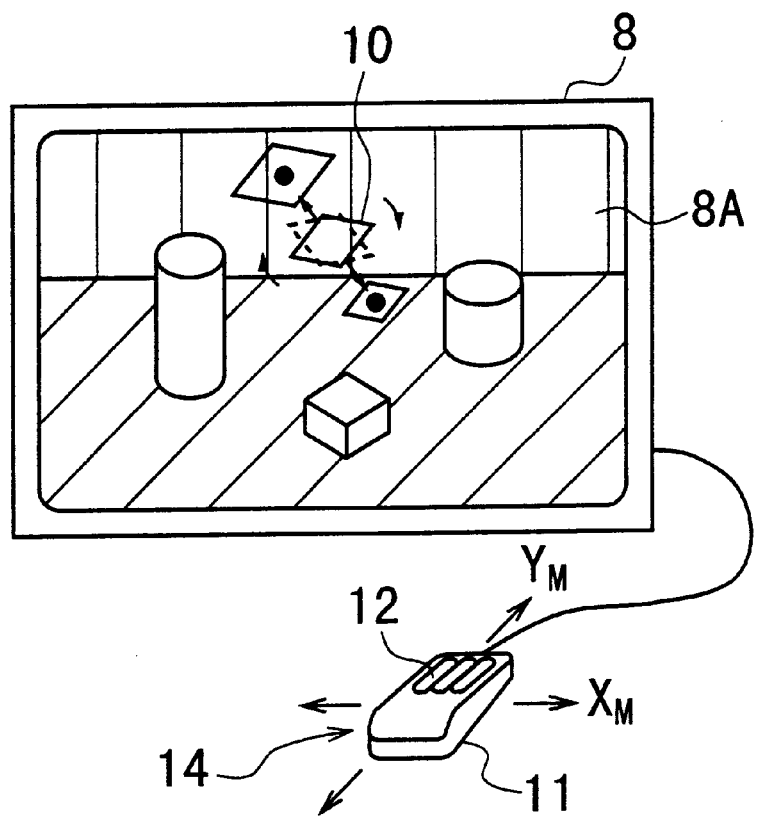
FIGS. 5A and 5B are schematic views showing the translational motion of the main cursor along the $Z_C$ axis defined perpendicular to the main cursor and the rotational motion around the same $Z_C$ axis, which are caused by the translational motions of the mouse along the $X_M$ and $Y_M$ axes in the instruction input system according to the first embodiment of FIG. 2.
Figure 5B:
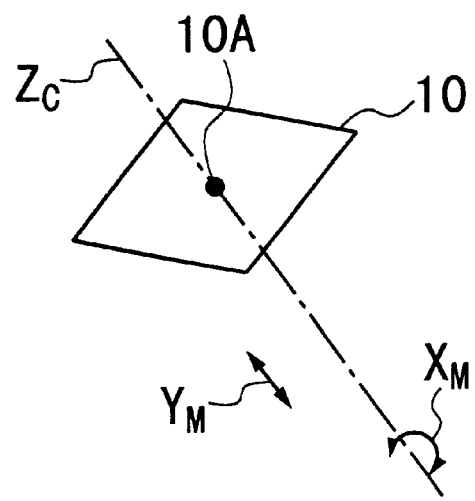

In the second input mode, as shown in FIGS. 5A and 5B, the translational motion $X_M$ of the mouse 14 corresponds to the rotational motion around the coordinate axis $Z_C$ of the main cursor 10. The translational motion $Y_M$ of the mouse 14 corresponds to the translational motion along the coordinate axis $Z_C$ of the main cursor 10.

Figure 6A:
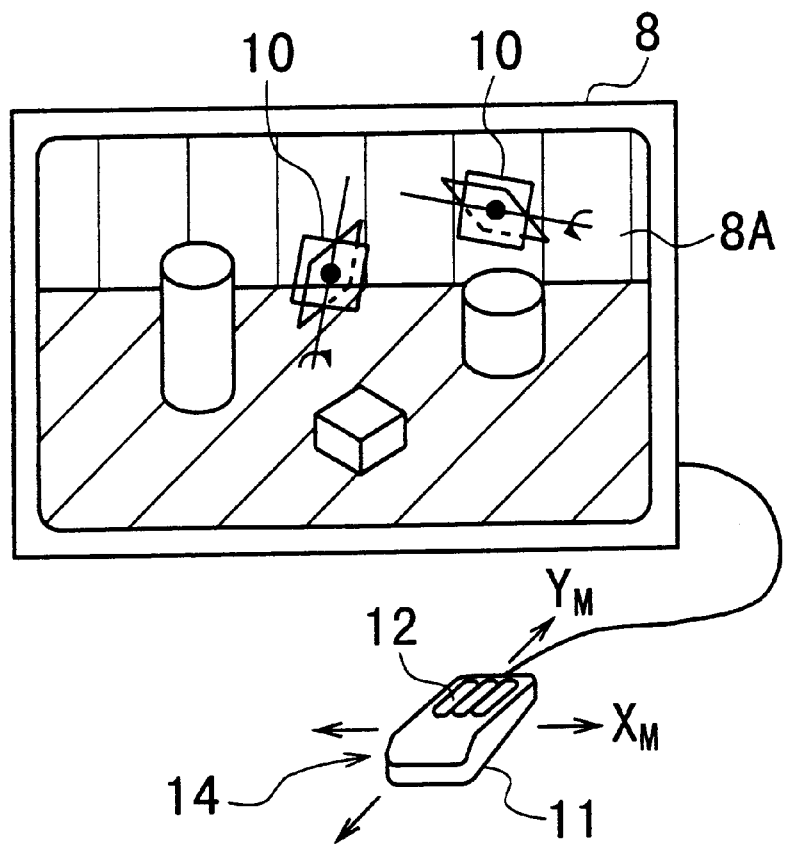
FIGS. 6A and 6B are schematic views showing the rotational motions of the main cursor around $X_C$ and $Y_C$ axes, which are caused by the translational motions of the mouse along the $X_M$ and $Y_M$ axes in the instruction input system according to the first embodiment of FIG. 2.
Figure 6B:
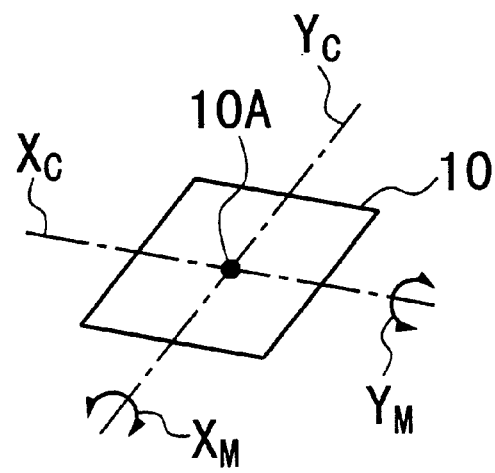

In the third input mode, as shown in FIGS. 6A and 6B, the translational motions $X_M$ and $Y_M$ of the mouse 14 correspond to the rotational motions around the coordinate axes $Y_C$ and $Z_C$ of the main cursor 10, respectively.

The correspondence in the third input mode may be replaced with any one of the following correspondences as shown in FIGS. 7A and 7B, FIGS. 8A and 8B, FIGS. 9A and 9B, FIGS. 10A and 10B, or FIGS. 11A and 11B.

Figure 7A:
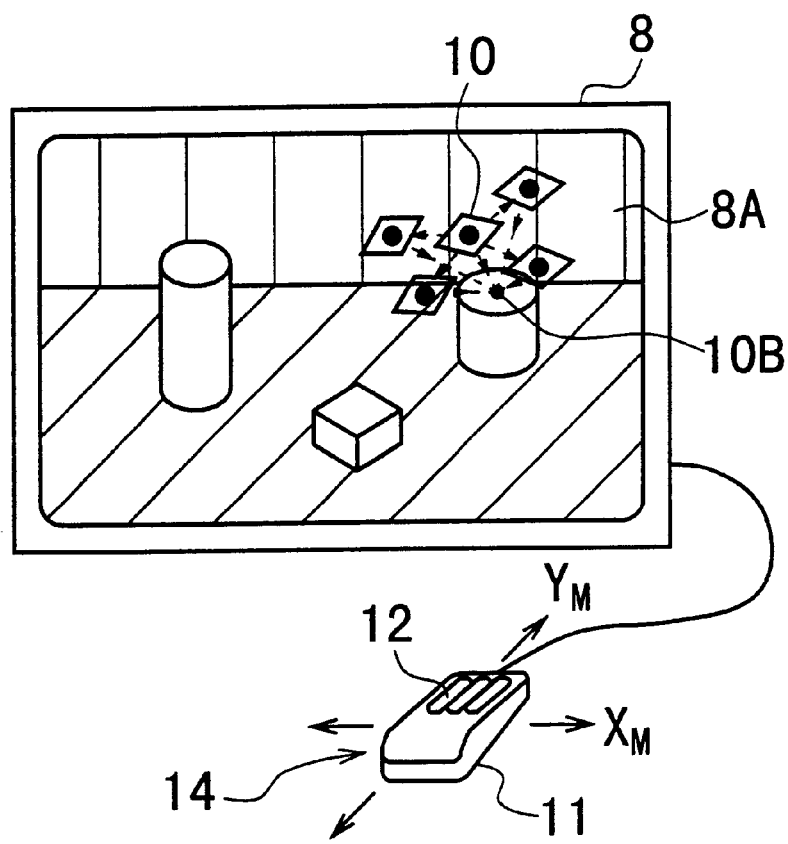
FIGS. 7A and 7B are schematic views showing the rotational motions around the $X_C$ and $Y_C$ axes where a point apart from the main cursor is used as a rotation center, which are caused by the translational motions of the mouse along the $X_M$ and $Y_M$ axes in the instruction input system according to the first embodiment of FIG. 2.
Figure 7B:
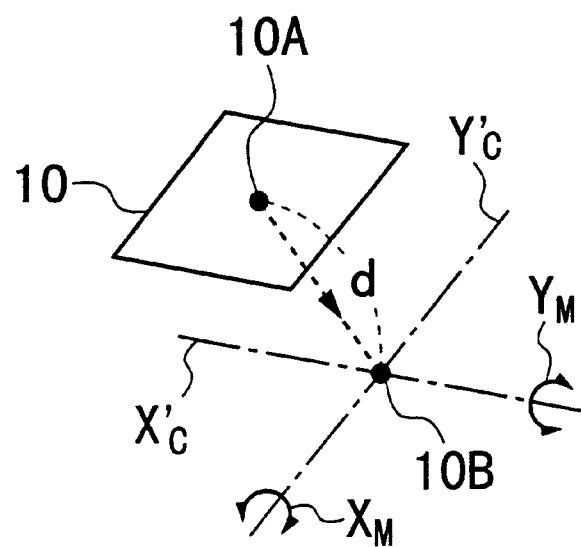

In FIGS. 7A and 7B, the translational motions $X_M$ and $Y_M$ of the mouse 14 correspond to the rotational motions around coordinate axes $X_C'$ and $Y_C'$, respectively. The coordinate axes $X_C'$ and $Y_C'$ are defined to be parallel to the coordinate axes $X_C$ and $Y_C$ of the main cursor 10, respectively, and at the same time, the origin of the axes $X_C'$ and $Y_C'$ is located at an optional preset point 10B apart from the center 10A of the main cursor 10 by a distance d.

Simply, the distance d is preset in the controller 15. However, the distance d may be determined by measuring the distance between the center 10A of the main cursor 10 and an object existing in the three-dimensional space near the preset point 10B with the use of a sensor provided on the robot 16.

More over, if a three-dimensional space is simulated in a three-dimensional CAD system or the like, the distance d may be determined by calculating the three-dimensional distance between a normal formed to perpendicularly intersect with the main cursor 10 at the center 10A and an object existing in the three-dimensional space near the preset point 10B.

Figure 8A:
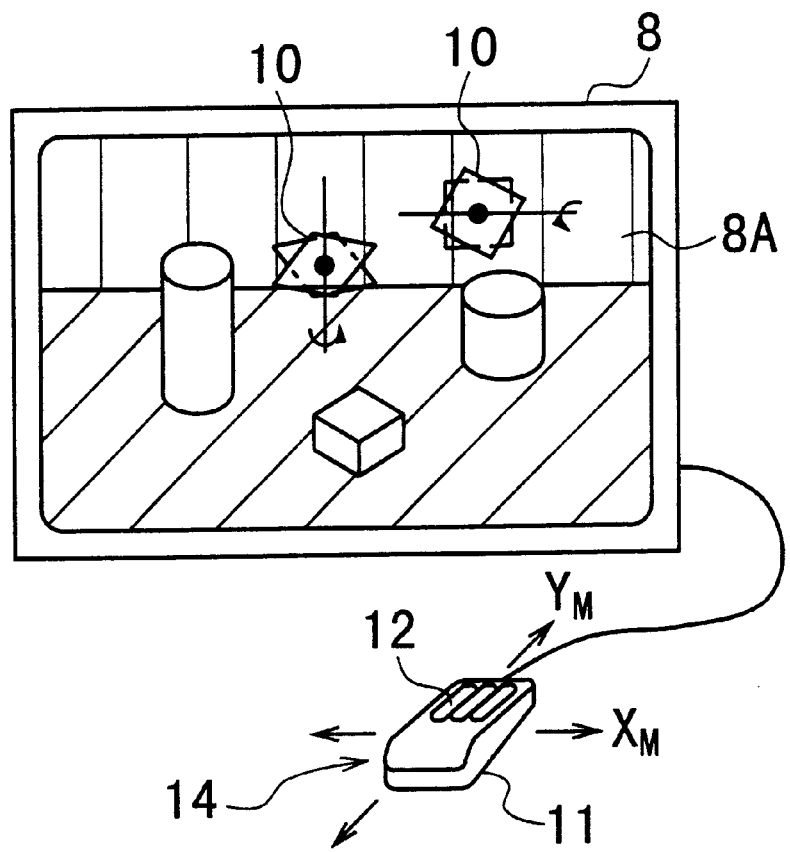
FIGS. 8A and 8B are schematic views showing the rotational motions around the $X_D$ and $Y_D$ axes defined on the screen of the display device, which are caused by the translational motions of the mouse along the $X_M$ and $Y_M$ axes in the instruction input system according to the first embodiment of FIG. 2.
Figure 8B:
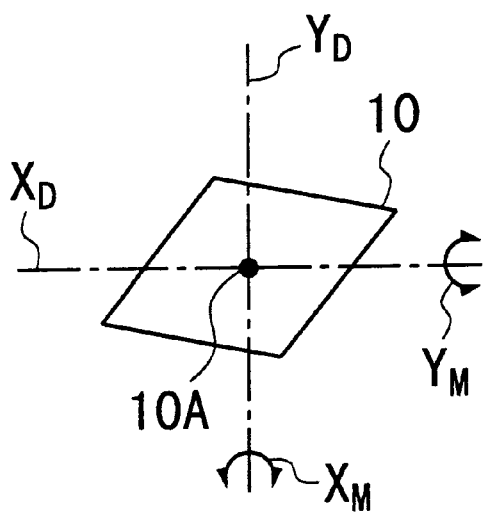

In FIGS. 8A and 8B, the translational motions $X_M$ and $Y_M$ of the mouse 14 correspond to the rotational motions around coordinate axes $X_D$ and $Y_D$, respectively, where the coordinate axes $X_D$ and $Y_D$ are defined to be parallel to the screen 8A of the display device 8.

Figure 9A:
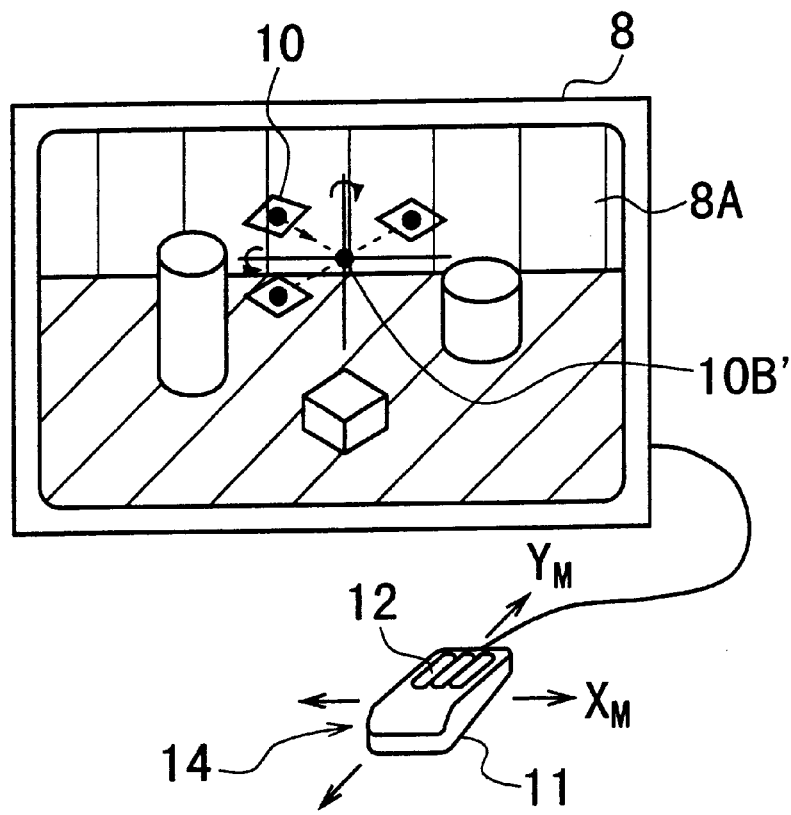
FIGS. 9A and 9B are schematic views showing the rotational motions around the $X_D$ and $Y_D$ axes where a point apart from the main cursor is used as a rotation center, which are caused by the translational motions of the mouse along the $X_M$ and $Y_M$ axes in the instruction input system according to the first embodiment of FIG. 2.
Figure 9B:
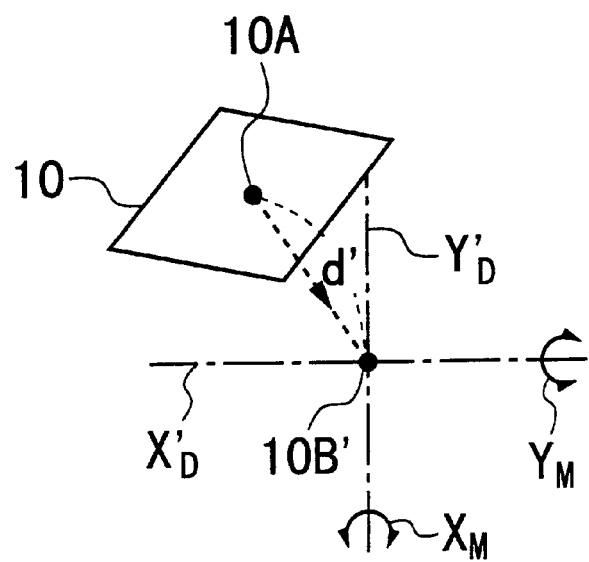

In FIGS. 9A and 9B, the translational motions $X_M$ and $Y_M$ of the mouse 14 correspond to the rotational motions around coordinate axes $X_D'$ and $Y_D'$, respectively. The coordinate axes $X_D'$ and $Y_D'$ are defined to be parallel to the coordinate axes $X_D$ and $Y_D$ of the screen 8A, respectively, and at the same time, the origin of the axes $X_D'$ and $Y_D'$ is located at an optional preset point 10B' apart from the center 10A of the main cursor 10 by a distance d'.

The distance d' may be determined in the same way as the case of FIGS. 7A and 7B.

Figure 10A:
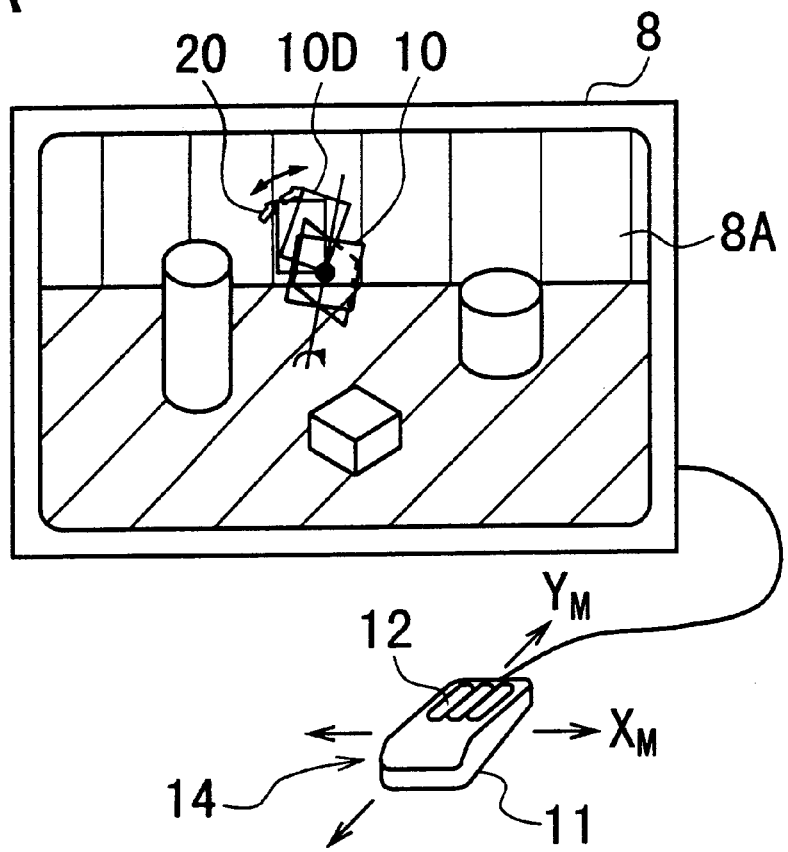
FIGS. 10A and 10B are schematic views showing the rotational motions around the $X_C$ and $Y_C$ axes where a virtual plane intersected with the main cursor is used, which are caused by the translational motions of the mouse along the $X_M$ and $Y_M$ axes in the instruction input system according to the first embodiment of FIG. 2.
Figure 10B:
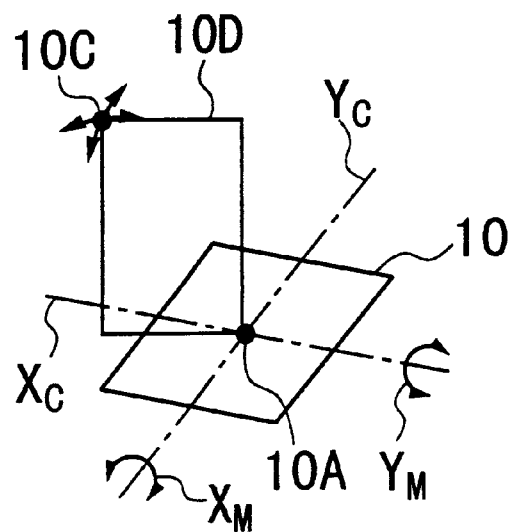

In FIGS. 10A and 10B, unlike the above-explained cases, a virtual plane 10D is additionally provided. The virtual plane 10D is defined to be parallel to the screen 8A of the display device 8. A bottom corner of the plane 10D is intersected with the cursor 10 at its center 10A.

An end point 10C is set on the virtual plane 10D at its top corner, where the arrow-shaped mouse cursor 20 is located at the time when the selection switch 12 is operated.

The translational motions $X_M$ and $Y_M$ of the mouse 14 correspond to the rotational motions around the coordinate axes $X_C$ and $Y_C$ of the cursor 10, respectively, where the relative positional relationship between the cursor 10 and the virtual plane 10D is kept unchanged during the rotational motions.

In the case of FIGS. 10A and 10B, the arrow-shaped mouse cursor 20 is moved along the screen 8A according to the translational motion of the mouse 14. Then, the orientation of the virtual plane 10D displayed on the screen 8A is changed according to the motion of the mouse cursor 20. As a result, there is an additional advantage that the human operator or user is able to have an operation feeling as if he rotates directly the main cursor 10 around its center 10A with the use of the mouse 14 while gripping a part of a virtual spherical surface (not shown) that surrounds the cursor 10.

This additional advantage may be expressed in different words as follows. Specifically, the operator can recognize directly the correspondence between the two-dimensional motion of the arrow-shaped mouse cursor 20 and the resultant three-dimensional motion thereof.

Figure 11A:
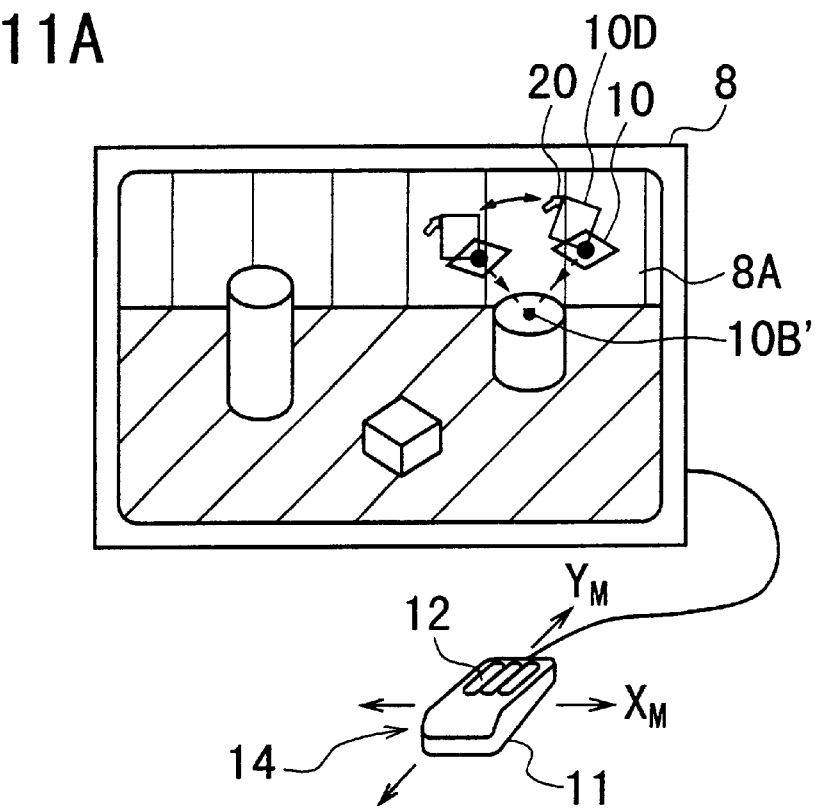
FIGS. 11A and 11B are schematic views showing the rotational motions around the $X_D$ and $Y_D$ axes where a virtual plane intersected with the main cursor is used and a point apart from the main cursor is used as a rotation center, which are caused by the translational motions of the mouse along the $X_M$ and $Y_M$ axes in the instruction input system according to the first embodiment of FIG. 2.
Figure 11B:
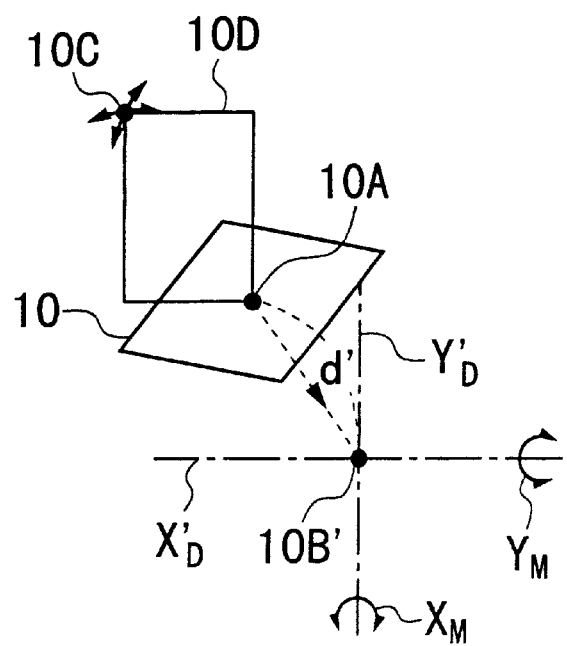

In FIGS. 11A and 11B, similar to the above case of FIGS. 10A and 10B, the same virtual plane 10D is additionally provided to be parallel to the screen 8A of the display device 8 and to intersect with the center 10A of the cursor 10. However, unlike the above case of FIGS. 10A and 10B, the center 10A of the cursor 10 is apart from the origin 10B' of the coordinate axes $X_D'$ and $Y_D'$ of the screen 8A by the distance d' (which is the same as the case of FIGS. 9A and 9B).

The end point 10C is set at a top corner of the virtual plane 10D at the position where the arrow-shaped mouse cursor 20 is located at the time when the selection switch 12 is operated.

The translational motions $X_M$ and $Y_M$ of the mouse 14 correspond to the rotational motions around the coordinate axes $X_D'$ and $Y_D'$ of the screen 8A, respectively, where the relative positional relationship between the cursor 10 and the virtual plane 10D is kept unchanged during the rotational motions.

In the case of FIGS. 11A and 11B, the arrow-shaped mouse cursor 20 is moved on the screen 8A according to the translational motion of the mouse 14. Then, the orientation of the virtual plane 10D displayed on the screen 8A is changed according to the motion of the mouse cursor 20. As a result, there is the same additional advantage as in the case of FIGS. 10A and 10B that the operator or user is able to have an operation feeling as if he rotates directly the cursor 10 around its center 10A with the use of the mouse 14 while gripping a part of a virtual spherical surface (not shown) that surrounds the cursor 10. In other words, the operator can recognize directly the correspondence between the two-dimensional motion of the arrow-shaped mouse cursor 20 and the resultant three-dimensional motion thereof.

Next, the operation of the conversion matrix generator 2 is explained in detail below.

As known well, typically, a three-dimensional coordinate conversion matrix A is given as the following expression (1).

$$A = \begin{pmatrix} n_x & o_x & a_x & P_x \\ n_y & o_y & a_y & P_y \\ n_z & o_z & a_z & P_z \\ 0 & 0 & 0 & 1 \end{pmatrix} \quad (1)$$

In the matrix A with four rows and four columns, the upper-left 3 by 3 elements correspond to the components of the rotational motion around the coordinate axes X, Y, and Z. The elements $P_x$, $P_y$, and $P_y$ corresponds respectively to the components of the translational motion along the coordinate axes X, Y, and Z, respectively.

The conversion matrix generator 2 determines the individual elements $n_x$, $o_x$, $a_x$, $n_y$, $o_y$, $a_y$, $n_z$, $o_z$, $a_z$, $P_x$, $P_y$, and $P_z$ of the matrix A according to the three-dimensional data 1A supplied from the three-dimensional data generator 13 of the input subsystem 1. The three-dimensional data 1A is generated with the use of the set of the two-dimensional motions applied by the mouse 14.

Here, the three-dimensional coordinates of a point i and the applied two-dimensional motions are defined as a vectors $P_i$ and M, respectively. Then, the vectors $P_i$ and M are given as the following expressions (2) and (3), respectively.

$$P_i = \begin{pmatrix} x_i \\ y_i \\ z_i \\ 1 \end{pmatrix} \quad (2)$$

$$M = \begin{pmatrix} X_M \\ Y_M \end{pmatrix} \quad (3)$$

In this case, if rotation matrices that cause rotation motions of the point i around the orthogonal coordinate axes X, Y, and Z by a rotation angle θ in the three-dimensional space are defined as $Rot_x$, $Rot_y$, and $Rot_z$, respectively, these matrices $Rot_x$, $Rot_y$, and $Rot_z$ are given by the following expressions (4), (5), and (6) by using the coordinate conversion matrix A shown in the expression (1), respectively.

$$Rot_x = \begin{pmatrix} 1 & 0 & 0 & 0 \\ 0 & \cos\theta & -\sin\theta & 0 \\ 0 & \sin\theta & \cos\theta & 0 \\ 0 & 0 & 0 & 1 \end{pmatrix} \quad (4)$$

$$Rot_y = \begin{pmatrix} \cos\theta & 0 & \sin\theta & 0 \\ 0 & 1 & 0 & 0 \\ -\sin\theta & 0 & \cos\theta & 0 \\ 0 & 0 & 0 & 1 \end{pmatrix} \quad (5)$$

$$Rot_z = \begin{pmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{pmatrix} \quad (6)$$

Moreover, if an orientation vector, a rear end of which is located at the origin of the orthogonal coordinate axes X, Y, and Z in the three-dimensional space, is defined as V, the orientation vector V is expressed as follows.

$$V = \begin{pmatrix} V_x \\ V_y \\ V_z \end{pmatrix} \quad (7)$$

In this case, if a translation matrix that causes a translation motion of the point i along the orientation vector V is defined as $Trans_V$, the matrix $Trans_V$ is given by the following expression (8).

$$Trans_V = Trans\begin{pmatrix} V_x \\ V_y \\ V_z \end{pmatrix} = \begin{pmatrix} 1 & 0 & 0 & V_x \\ 0 & 1 & 0 & V_y \\ 0 & 0 & 1 & V_z \\ 0 & 0 & 0 & 1 \end{pmatrix} \quad (8)$$

Therefore, using the translation matrix $Trans_V$ shown in the expression (8), the conversion matrix A of the translation motions along the coordinate axes $X_C$ and $Y_C$ of the main cursor 10 (see FIGS. 4A and 4B) are given by the following expression (9).

$$A = Trans\begin{pmatrix} X_M \\ Y_M \\ 0 \end{pmatrix} = \begin{pmatrix} 1 & 0 & 0 & X_M \\ 0 & 1 & 0 & Y_M \\ 0 & 0 & 1 & 0 \\ 0 & 0 & 0 & 1 \end{pmatrix} \quad (9)$$

Similarly, using the rotation matrices $Trans_y$ and $Rot_x$ shown in the expressions (8) and (4), the conversion matrix A of the rotation motion around the coordinate axis $Z_C$ and the translational motion along the coordinate axis $Z_C$ (see FIGS. 5A and 5B) are given by the following expression (10).

$$A = Rot_x(X_M) \cdot Trans\begin{pmatrix} 0 \\ 0 \\ Y_M \end{pmatrix} \quad (10)$$

Using the rotation matrices $Trans_y$ and $Rot_y$ shown in the expressions (8) and (5), the conversion matrix A of the rotation motions around the coordinate axes $X_C$ and $Y_C$ (see FIGS. 6A and 6B) are given by the following expression (11).

$$A = Rot_y(X_M) \cdot Rot_x(Y_M) \quad (11)$$

The remaining translational and/or rotational motions around the coordinate axes $X_C$ and $Y_C$ shown in FIGS. 7A and 7B, 8A and 8B, 9A and 9B, 10A and 10B, and 11A and 11B can be given in the same way. However, the introduction processes of the results are very complicated and therefore, they are not described in this specification.

With the instruction input system according to the first embodiment of the present invention, as explained above, when a desired instruction is inputted by the input subsystem 1 through the screen 8A of the display device 8, thereby giving a desired motion of changing at least one of the position and the attitude of the robot 16 or video camera 5 existing in the three-dimensional space, the conversion matrix A is generated by the conversion matrix generator 2 according to the desired motion.

Then, the post-motion position and attitude of the main cursor 10 are determined by the cursor projector 4 through mathematical projection of the square main cursor 10 onto the specific plane using the conversion matrix A. The post-motion position and attitude of the main cursor 10 indicate or denote the position and the attitude of the robot 16 in the three-dimensional space after the desired motion is carried out.

Accordingly, the instruction to move the robot 16 or camera 5 existing in the three-dimensional space is able to be readily and efficiently inputted by using the main cursor 10 displayed on the screen 8A.

Besides, due to the post-motion position and attitude of the main cursor 10, the user or operator of the instruction input system according to the first embodiment is able to recognize directly the relationship or correspondence between the motion of the robot 16 or camera 5 in the three-dimensional space and a motion of the main cursor 10 displayed on the screen 8A.

SECOND EMBODIMENT

Figure 12A:
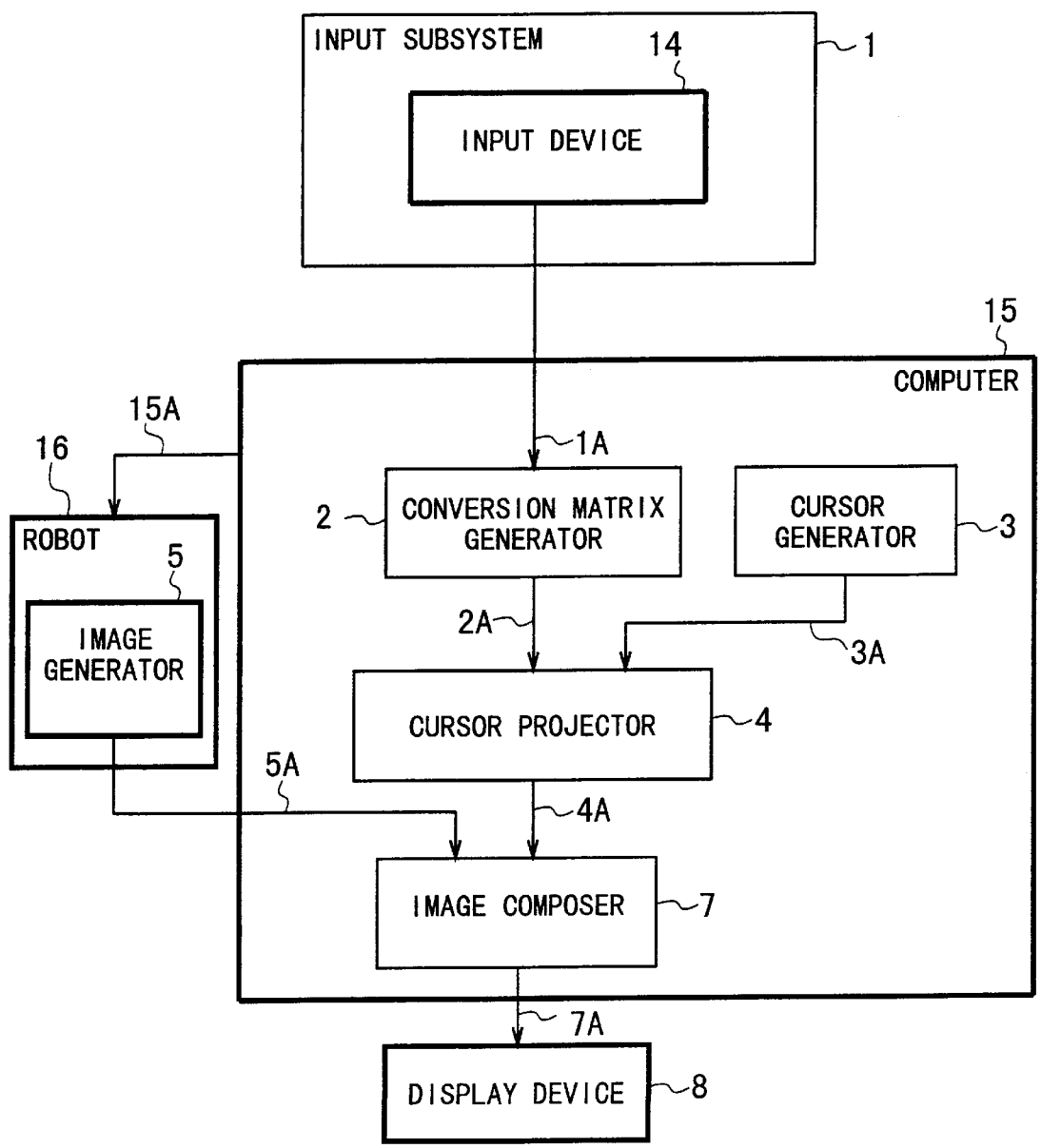
FIG. 12A is a block diagram showing the configuration of an instruction input system according to a second embodiment of the present invention, which is designed for a remote-controllable robot equipped with a video camera.
Figure 12B:
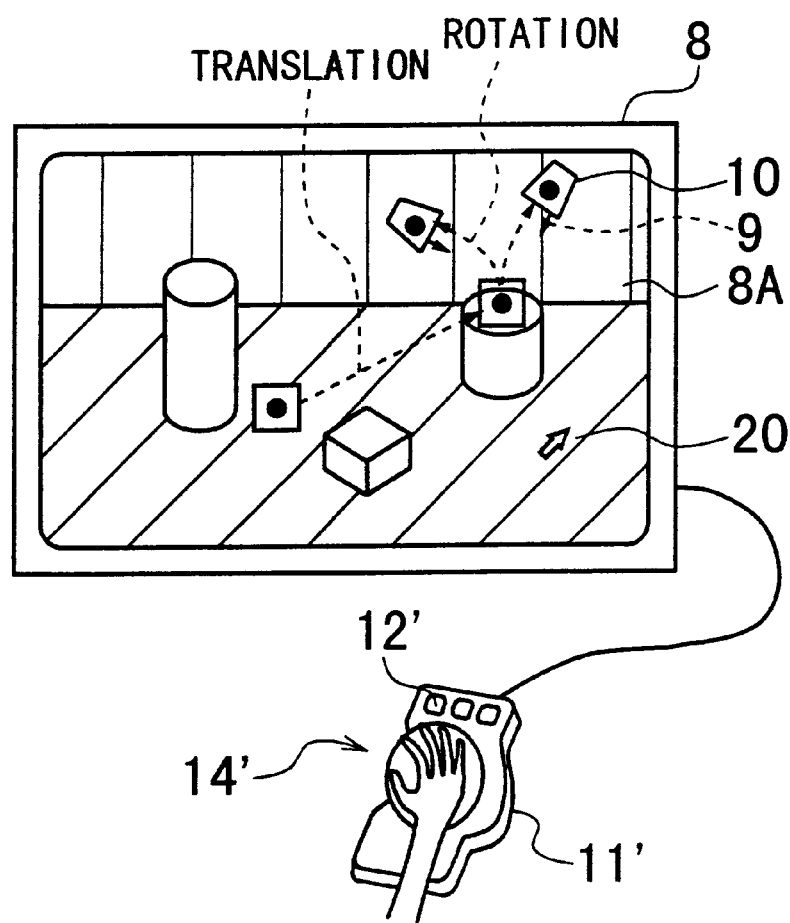
FIG. 12B is a schematic view of a screen and an image shown therein of a display device provided in the instruction input system according to the second embodiment of FIG. 12A.

FIGS. 12A and 12B show an instruction input system according to a second embodiment, in which a mouse 14' with six degrees of freedom is provided instead of the three-button mouse 14 in the instruction input system according to the first embodiment.

The mouse 14' with six freedom degrees has three buttons 12' and a grippable ball on its body 11'. Although the function of the mouse 14' is the same as that of the mouse 14 used in the first embodiment, it has additional functions to specify a desired translational motion along all the three coordinate axes X, Y, and Z in the three-dimensional space and to specify a desired rotational motion around all the same coordinate axes, simultaneously.

One of the buttons 12' serves as a selection switch for selecting or specifying the rotation center of a desired rotational motion. This is effective in the above cases shown in FIGS. 7A and 7B, FIGS. 9A and 9B, and FIGS. 11A and 11B.

Therefore, the use of the mouse 14' makes it possible to directly input three-dimensional coordinates into the controller 15. This means that the two-dimensional coordinate designator 11 and the three-dimensional data generator 13 in the input subsystem 1 as shown in FIG. 2 are unnecessary, resulting in simplification of the configuration of the instruction input system.

The arrow-shaped assistant cursor 9 displayed on the screen 8A indicates the orientation of the normal of the square main cursor 10. The square shape of the main cursor 10 is changed to a parallelogram or trapezoidal shape according to the orientation and angle of the desired rotational motion.

Thus, not only the initial square shape of the main cursor 10 is changed according to the orientation and angle of the inputted, desired rotational motion but also the arrow-shaped assistant cursor 9 is displayed on the screen 8A together with the main cursor 10. Therefore, there is an additional advantage that the user recognizes readily the orientation and angle of the rotational motion.

THIRD EMBODIMENT

FIGS. 13, FIGS. 14A to 14C, and FIGS. 15A to 15C show an instruction input system according to a third embodiment, which has the same configuration as that of the first embodiment shown in FIG. 2 except that an image processor 6 is added. Therefore, the explanation about the same configuration is omitted here by attaching the same reference symbols as those in the first embodiment to the same elements for the sake of simplification.

Figure 13:
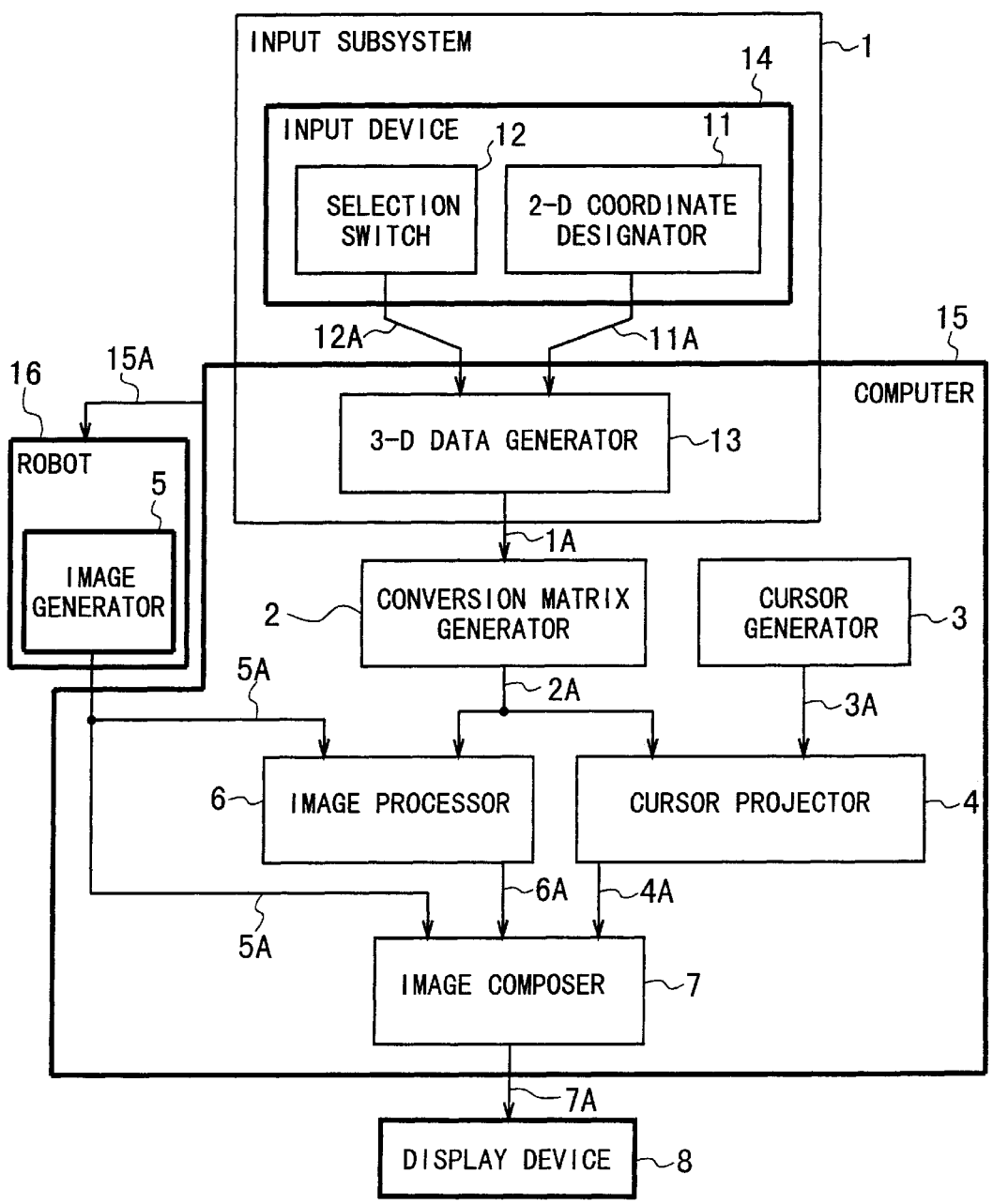
FIG. 13 is a block diagram showing the configuration of an instruction input system according to a third embodiment of the present invention, which is designed for a remote-controllable robot equipped with a video camera.

As seen from FIG. 13, the image processor 6 receives the image data 5A from the image generator or video camera 5 and the conversion matrix data 2A from the conversion matrix generator 2. The processor 6 isolates a specific part of the image 21 of the neighborhood of the robot 16 to thereby produce a partial image. Then, the processor 6 deforms the partial image thus produced so as to be inserted into the inside of the square main cursor 10 on the screen 8A as an internal image 6B, thereby producing an internal image data 6A. The internal image data 6A is outputted to the image composer 7.

The image composer 7 forms the internal image 6B according to the internal image data 6A and at the same time, the internal image 6B is displayed on the screen 8A with the neighborhood image 21 and the main cursor 10.

Therefore, it may be said that the main cursor 10 corresponds to a window of a front lens of the camera 5, a window of an output image of the camera 5, or a window of a projection screen in the camera 5.

Figure 14A:
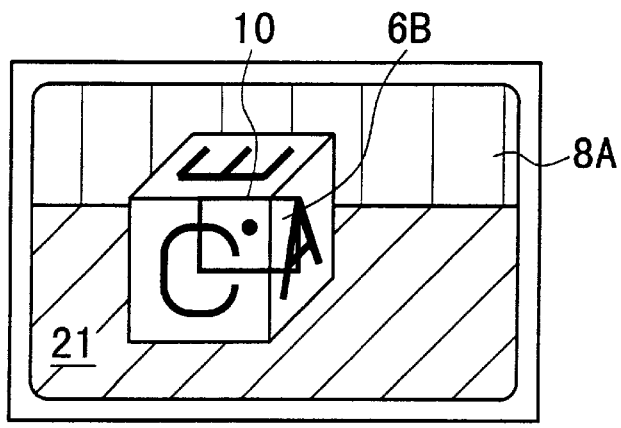
FIGS. 14A to 14C are schematic views of the screen of the display device provided in the instruction input system according to the third embodiment of FIG. 13, respectively, in which the robot and camera are translated forward with respect to the screen.
Figure 14B:
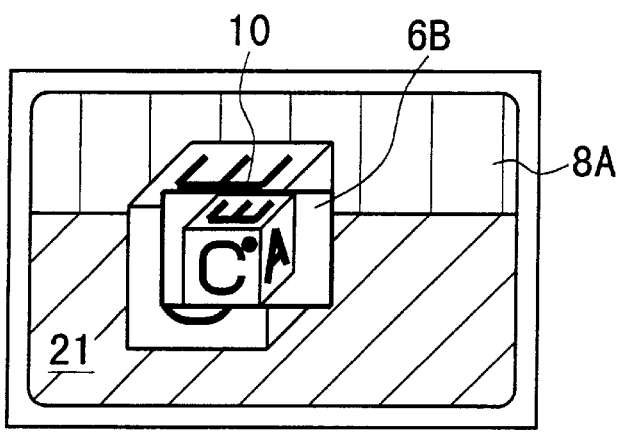
Figure 14C:
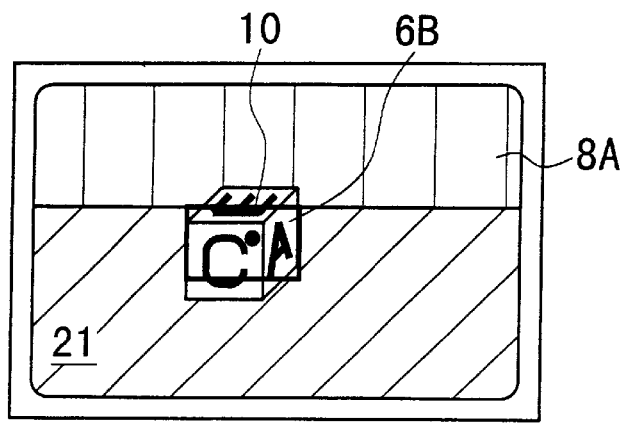

FIGS. 14A to 14C shows an example where the square main cursor 10 is moved forward with respect to the screen 8A.

As shown in FIG. 14A, before a desired moving instruction is inputted by the instruction input system according to the third embodiment, the square main cursor 10 is located on the center of the screen 8A. The internal image 6B displayed in the main cursor 10 is a partial image of the neighborhood of the robot 16. At this time, the system is in the stand-by state.

Next, an instruction to cause a forward translational motion of the cursor 10 with respect to the screen 8A is inputted into the instruction input system according to the third embodiment using the three-button mouse 14. Then, the conversion matrix A is generated by the conversion matrix generator 2 according to the inputted translational motion. In this step, as shown in FIG. 14B, the main cursor 10 is enlarged according to the applied moving instruction using the conversion matrix A. On the other hand, the image processor 6 produces the internal image 6B using the conversion matrix A. The internal image 6B thus produced is then displayed in the inside of the enlarged main cursor 10 with a rectangular shape.

Subsequently, a specific determination to submit the applied instruction to the robot 16 is carried out by the human operator. Thus, the robot 16 and the camera 5 are actually moved according to the applied instruction.

After the desired motion of the robot 16 and the camera 5 is practically completed, a new reduced image of the neighborhood of the camera 5 is displayed on the screen 8A as the image 21 and at the same time, the square cursor 10 with the initial size is located at the initial position, i.e., the center of the screen 8A. Thus, the instruction input system according to the third embodiment is held in the stand-by state.

Figure 15A:
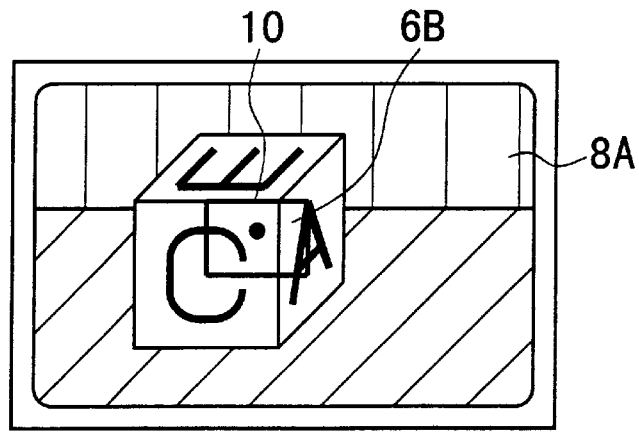
FIGS. 15A to 15C are schematic views of the screen of the display device provided in the input subsystem according to the third embodiment of FIG. 13, respectively, in which the robot and camera are rotated around the $Y_D$ axis.
Figure 15B:
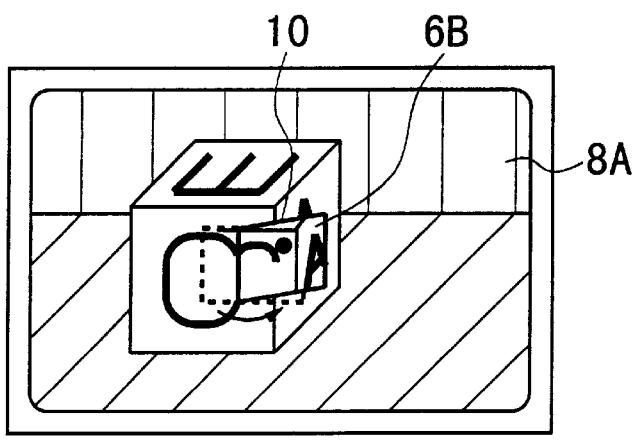
Figure 15C:
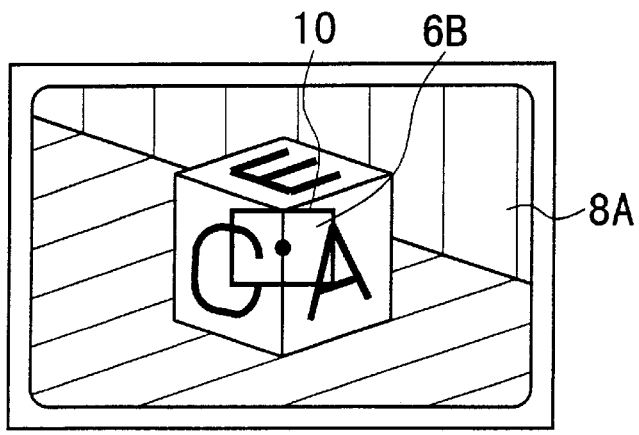

FIGS. 15A to 15C shows another example where the square main cursor 10 is moved around the vertical coordinate axis $Y_D$ of the screen 8A.

As shown in FIG. 14A, before a desired moving instruction is inputted into the instruction input system according to the third embodiment, the square main cursor 10 is located on the center of the screen 8A. The internal image 6B displayed in the main cursor 10 is a partial image of the neighborhood of the robot 16. The state is the same as the example shown in FIG. 14A.

Next, an instruction to cause a rotational motion of the cursor 10 around the vertical coordinate axis $Y_D$ of the screen 8A is inputted into the instruction input system according to the third embodiment using the three-button mouse 14. Then, the conversion matrix A is generated by the conversion matrix generator 2 according to the inputted rotational motion. In this step, as shown in FIG. 15B, the main cursor 10 is deformed to a trapezoidal shape according to the applied moving instruction using the conversion matrix A. On the other hand, the image processor 6 produces the internal image 6B using the conversion matrix A. The internal image 6B thus produced is then displayed in the inside of the deformed main cursor 10 with a trapezoidal shape.

Subsequently, the specific determination to submit the applied moving instruction to the robot is carried out by the human operator. Thus, the robot and the camera 5 are moved according to the applied instruction.

After the desired motion of the camera 5 is practically completed, a new rotated image of the neighborhood of the camera 5 is displayed on the screen 8A as the image 21 and at the same time, the square cursor 10 with the initial size is located at the initial position, i.e., the center of the screen 8A. Thus, the instruction input system according to the third embodiment is placed in the stand-by state.

Additionally, if the screen 8A is renewed after the specific determination to submit the applied moving instruction to the robot 16 is carried out, the internal image 6B displayed prior to the above determination step may be enlarged after the same determination step. In this case, there is an additional advantage that the relationship between the internal image 6B and the renewed image 21 on the screen 8A is recognized more readily.

In the first and third embodiments, various two-dimensional coordinates are inputted by the mouse 14 serving as the coordinate designator 11 of the input subsystem 1 using the specific correspondence. However, it is needless to say that the present invention is not limited to these cases. Any other correspondence may be used.

While the preferred forms of the present invention has been described, it is to be understood that modifications will be apparent to those skilled in the art without departing from the spirit of the invention. The scope of the invention, therefore, is to be determined solely by the following claims.

What is claimed is:

1. An instruction input system comprising:
   (a) an input subsystem including a display device and an input device for inputting a desired instruction through the screen of the display device;
   said instruction including a desired motion for changing at least one of a position and an attitude of an object existing in a three-dimensional space;
   (b) a cursor generator that generates a main cursor designating the position and the attitude of said object;
   said main cursor being displayed on said screen of said display device;
   (c) a cursor controller that specifies a post-motion position and a post-motion attitude of said main cursor by applying said desired motion included in said inputted instruction to said main cursor;
   said cursor controller forming a mathematical projection of said main cursor onto a plane based on said specified post-motion position and said specified post-motion attitude of said main cursor;
   said mathematical projection of said main cursor being displayed on said screen of said display device; and
   (d) said mathematical projection of said main cursor on said screen designating a post-motion position and a post-motion attitude to be assumed by said object after said object is moved according to said desired motion in said three-dimensional space.

2. The system as claimed in claim 1, wherein said cursor controller includes a conversion matrix generator that generates a conversion matrix according to said desired motion included in said inputted instruction;
   and wherein said conversion matrix is used to specify said post-motion position and said post-motion attitude of said main cursor.

3. The system as claimed in claim 1, wherein said object is equipped with an image generator that generates an image of a specific target;
   and wherein said image of said target is displayed on said screen of said display device together with said main cursor.

4. The system as claimed in claim 3, further comprising an image processor that isolates a part of said image of said target;
   wherein said image processor displays said part of said image of said target in said main cursor as an internal image.

5. The system as claimed in claim 1, wherein said cursor generator generates an assistant cursor, said assistant cursor is displayed on said screen of said display device;
   and wherein said assistant cursor designates an orientation of said main cursor.

6. The system as claimed in claim 5, wherein said cursor controller specifies a post-motion position and a post-motion attitude of said assistant cursor by applying said desired motion included in said inputted instruction to said assistant cursor;
   and wherein said cursor controller forms a mathematical projection of said assistant cursor onto said plane based on said specified post-motion position and said specified post-motion attitude of said assistant cursor
   said mathematical projection of said assistant cursor being displayed on said screen of said display device.

7. The system as claimed in claim 1, wherein said input device in said input subsystem is capable of inputting six elementary motions of said desired instruction in said three-dimensional space.

8. The system as claimed in claim 1, wherein said input device in said input subsystem is capable of inputting two-dimensional data corresponding to said desired instruction in said three-dimensional space in each of input modes;
   said input device having a mode selection switch for selecting one of said input modes;
   and wherein said input subsystem has a three-dimensional data generator for generating a three-dimensional data from said two-dimensional data inputted in said respective input modes.

9. The system as claimed in claim 8, wherein a first set of two-dimensional coordinate values are specified by a user at a timing when said mode selection button is operated and a second set of two-dimensional coordinate values are specified at a position determined by said user on said screen in each of said input modes;
   and wherein a set of two-dimensional difference values between said first and second sets of two-dimensional coordinate values are inputted from said input subsystem into said cursor controller as said desired motion of said object in said three-dimensional space.

10. The system as claimed in claim 9, wherein as said input modes of said input subsystem, first, second, and third input modes are provided for said input subsystem;
    and wherein in said first input mode, two translational motions along two orthogonal coordinate axes defined on (i) said main cursor, (ii) said screen of said display device, or (iii) a plane parallel to said main cursor or said screen of said display device and apart from a specific distance from said main cursor or said screen of said display device are used as a first one of said set of two-dimensional difference values;
    and wherein in said second input mode, a translational motion along a normal of said two orthogonal coordinate axes and a rotational motion around said normal are used as a second one of said set of two-dimensional difference values;
    and wherein in said third input mode, two rotational motions around said two orthogonal coordinate axes are used as a third one of said set of two-dimensional difference values.

11. The system as claimed in claim 9, wherein as said input modes of said input subsystem, first, second, and third input modes are provided for said input subsystem;
    and wherein in said first input mode, two translational motions along two orthogonal coordinate axes defined on (i) said main cursor, (ii) said screen of said display device, or (iii) a plane parallel to said main cursor or said screen of said display device and apart from a specific distance from said main cursor or said screen of said display device are used as a first one of said set of two-dimensional difference values;

and wherein in said second input mode, a translational motion along a normal of said two orthogonal coordinate axes and a rotational motion around said normal are used as a second one of said set of two-dimensional difference values;

and wherein in said third input mode, said two rotational motions around said two orthogonal coordinate axes are defined while (i) a center of said main cursor or (ii) a point apart from said main cursor by a specific distance is used as a rotation center.

12. The system as claimed in claim 9, wherein as said input modes of said input subsystem, first, second, and third input modes are provided for said input subsystem;

and wherein in said first input mode, two translational motions along two orthogonal coordinate axes defined on (i) said main cursor, (iii) said screen of said display device, or (iii) a plane parallel to said main cursor or said screen of said display device and apart from a specific distance from said main cursor or said screen of said display device are used as a first one of said set of two-dimensional difference values;

and wherein in said second input mode, a translational motion along a normal of said two orthogonal coordinate axes and a rotational motion around said normal are used as a second one of said set of two-dimensional difference values;

and wherein in said third input mode, a virtual plane is provided on said screen of said display device;

said virtual plane being parallel to and apart from said screen of said display device and intersected with said main cursor at an intersection point;

an end point of said virtual plane being set at a position where said third input mode is selected on said screen of said display device;

said end point of said virtual plane being rotatable around said intersection point toward a desired orientation by said input device while keeping a positional relationship between said virtual plane and said main cursor unchanged.

* * * * *